United States Patent [19]
Gerling

[11] Patent Number: 5,931,142
[45] Date of Patent: Aug. 3, 1999

[54] DEVICE FOR THE LINEAR ACTUATION OF A CONTROL MEMBER

[75] Inventor: Dieter Gerling, Aachen, Germany

[73] Assignee: U.S. Philips Corporation, New York, N.Y.

[21] Appl. No.: 08/872,642

[22] Filed: Jun. 10, 1997

[30] Foreign Application Priority Data

Jul. 10, 1996 [DE] Germany .......................... 196 27 743

[51] Int. Cl.[6] ............................ F02B 47/08; F16K 31/04; F02M 25/07
[52] U.S. Cl. ................................. 123/568.23; 251/129.12
[58] Field of Search ................. 123/568.23; 251/129.11, 251/129.12, 129.13

[56] References Cited

U.S. PATENT DOCUMENTS

| | | | |
|---|---|---|---|
| 4,789,132 | 12/1988 | Fujita et al. | 251/129.11 |
| 5,146,126 | 9/1992 | Hutchins | 310/156 |
| 5,606,957 | 3/1997 | Feucht | 123/568.23 |

FOREIGN PATENT DOCUMENTS

4423313A1  1/1996  Germany .......................... H02K 7/06

Primary Examiner—Willis R. Wolfe
Assistant Examiner—Arnold Castro
Attorney, Agent, or Firm—Robert J. Kraus

[57] ABSTRACT

The invention relates to a linear actuation device for a control member (1), particularly a valve tappet (1) in a gas or liquid conduit (2), the device including a rotor (7) with an inner screwthread (10) whose rotary movement is convertible into a linear movement of a threaded spindle (5) which is locked against rotation and which is engageable with the inner screwthread (10).

In order to achieve that such a device can be realized simply, cheaply and with a high resolution of the linear movement of the control member, the rotor (7) comprises a magnetized rotary body (8) which cooperates with a single-strand electrically energizable stator (13), the angular position of the rotor (7) being adjustable by means of the stator current and the maximum angular rotation of the rotor (7) being smaller than 180°.

14 Claims, 3 Drawing Sheets

DEVICE FOR THE LINEAR ACTUATION OF A CONTROL MEMBER

BACKGROUND OF THE INVENTION

The invention relates to a device for the linear actuation of a control member, particularly a valve tappet in a gas or liquid conduit, the device comprising a rotor having an inner screwthread whose rotary movement is convertible into a linear movement of a threaded spindle which is locked against rotation and which is engageable with the inner screwthread.

Such a device is known from DE 44 23 313 A1. This known device comprises a double-strand claw pole stepper motor for the linear actuation of the control member. In such a claw pole stepper motor the number of steps per revolution is limited by the geometry. Both the stator claws and the magnetic rotor poles must have certain minimum dimensions. In order to achieve a high resolution of the linear movement and a high actuation accuracy of the control member it is possible to use, for example, a motor with a large circumferential length, i.e. with a large diameter. However, such a motor has large motor dimensions, large mass moments of inertia and, consequently, a comparatively poor dynamic performance. In the known device a high resolution of the linear movement is achieved in that the threaded spindle has a screwthread with a comparatively fine pitch. It is often advantageous that in the case of faults, for example in the case of power failure, the control member automatically returns to its initial position. In the known device, where the threaded spindle has a thread with a comparatively fine pitch, this requires a very large return force, which is achieved in that the threaded spindle carries an electromagnet which, when energized, cooperates with an armature element and a rod and urges the rod into the threaded spindle against spring force. Such a construction is very intricate and expensive.

SUMMARY OF THE INVENTION

It is an object of the invention to provide a device of the type defined in the opening paragraph, which is simple and cheap and by means of which a high resolution of the linear movement of the control member can be achieved.

According to the invention this object is achieved in that the rotor comprises a magnetized rotary body which cooperates with a single-strand electrically energizable stator, the angular position of the rotor being adjustable by means of the stator current and the maximum angular rotation of the rotor being smaller than 180°.

A magnetized rotary body is to be understood to mean a permanent magnetic or electrically magnetizable rotatable part.

Such a device requires only a stator coil, which results in a significant reduction of the complexity of the electronic power control and the number of connection terminals as compared with a claw pole stepper motor. The angular position of the rotor and hence the linear movement of the threaded spindle can be controlled continuously by means of the motor current. As a result of this, the attainable resolution of the linear movement of the control member is not limited to discrete steps as in a claw pole stepper motor. Since such a device generates a torque which varies substantially sinusoidally with respect to the angular position of the rotor, the maximum angle of rotation of the rotor is limited to values below 180°.

An advantageous embodiment of the invention is characterized in that sensor means have been provided to generate sensor signals in dependence on the angular position of the rotor or the linear position of the threaded spindle, and control means have been provided to control the angular position of the rotor in dependence on the sensor signals.

The sensor means detect the instantaneous position of the rotor and generate sensor signals in dependence upon the angular position of the rotor. These sensor signals are applied to the control means, which control the angular position of the rotor in dependence upon the sensor signals. The instantaneous angular position of the rotor can be controlled very accurately by means of such a device. Accuracies of less than 0.1 angular degrees are then attainable by a suitable choice of the sensor means and the control means.

A further advantageous embodiment of the invention is characterized in that measurement means have been provided to measure the current and the voltage of the stator, the measurement means generate measurement signals in dependence on the angular position of the rotor, and control means have been provided to control the angular position of the rotor in dependence on the measurement signals.

This embodiment does not require any sensors. The angular position of the rotor is derived from the measurement values of the stator current and voltage and controlling is effected accordingly.

A further advantageous embodiment of the invention is the inner screwthread of the rotor and the screwthread of the threaded spindle are coarse-pitch screwthreads having a pitch angle of at least 30°. The pitch angle α is defined as $$\alpha = \arctan\left(\frac{h}{2\pi r}\right)$$

Here, h is the linear of the screwthread (linear travel per revolution) and r is the radius of the screwthread. The device in accordance with the invention makes it possible to obtain very high torques. As a result of this, the threaded spindles can have a coarse pitch screwthread, which requires a higher driving torque than a fine-pitch screwthread for a given counter force. This finer pitch requires a higher motor torque but has the advantage that the return force, required to return the threaded spindle to its initial position when the stator excitation fails, is reduced.

By means of such a coarse-pitch screwthread it is possible to obtain a comparatively large linear travel of the threaded spindle in spite of the fact that the angle of rotation of the rotor is limited to values below 180°.

A further advantageous embodiment of the invention is characterized in that calibration means have been provided to calibrate the relationship between the angular position of the rotor and the linear position of the control member in a reference position of the control member.

As a result of various ambient influences, particularly temperature fluctuations, the relationship between the angular position of the rotor and the linear position of the control member can change during operation of the device. For example, if the temperature to which the threaded spindle and the control member are exposed increases, the threaded spindle expands and the relationship between the angular position of the rotor and the linear position of the control member changes. The relationship between the angular position of the rotor and the linear position of the control member can then be actualized by a suitable calibration in a reference position.

In an advantageous embodiment of the invention the control member is a valve tappet of a valve and the reference position corresponds to the shut-off position of the valve.

Valve tappets, particularly in gas or liquid conduits, are often exposed to very high temperatures. These high temperatures cause the threaded spindle to expand and thereby change the relationship between the angular position of the rotor and the linear position of the valve tappet. It is advantageous to use the shut-off position of the valve as the reference position. When the valve tappet is in the shut-off position this unambiguously defines its linear position and the relationship between the angular position of the rotor and this shut-off position of the valve tappet can be brought up to date each time that the tappet is in the shut-off position.

A further advantageous embodiment of the invention is characterized in that the gap between the stator and the rotor is given such a non-uniform shape that the rotor assumes a preferred angular position when the stator is not energized.

For many uses it is required that the control member assumes a given position upon turning off or when the stator current cuts out. This can be achieved advantageously by a non-uniform shape of the gap between the stator and the magnetized rotor. When the stator coil is not energized the rotor assumes the preferred angular position, which corresponds to the angular position with minimal magnetic resistance for the rotor. Such a non-uniform shape of the air gap is simple and can be realized at low cost. This requires neither any complex mechanical return means, as for example return springs, nor any other additional electromagnetic return means. The magnetic return forces as a result of the non-uniform shape of the air gap can be utilized in a particularly advantageous manner if the screwthread of the threaded spindle has a coarse pitch, as already described hereinbefore. As a result of this coarse-pitch thread the driving torque to be exerted by the device for the linear movement of the spindle for a given counter force increases but, on the other hand, the return force required to return the rotor into the preferred angular position when the stator is not energized is reduced. Owing to this comparatively small return force this force can be obtained very simply by a non-uniform shape of the air gap between the stator and the magnetized rotor. Moreover, in such an embodiment of the invention the preferred angular position need not be identical to the angular starting or end position. Thus, the preferred linear position, occupied by the control member in the preferred angular position of the rotor, is not necessarily identical to the starting or end position of the linear path of movement of the control member. If the control member is, for example, a valve tappet, it is possible to make sure that in the case that the current supply fails the valve is not fully closed or fully opened but assumes a given intermediate position in which emergency operation is possible.

In a further advantageous embodiment of the invention there has been provided at least one auxiliary magnet which moves the rotor into the preferred angular position when the stator is not energized.

By means of this auxiliary magnet, which is suitably embedded in a slot in the stator, it is also possible to ensure that the rotor assumes a preferred angular position and, as a consequence, the control member assumes a preferred linear position when the stator is not energized. The required return torque can then obtained either by means of the auxiliary magnet alone or in combination with an air gap having a suitable non-uniform shape.

A further advantageous embodiment of the invention is characterized in that the sensor means for controlling the angular position of the rotor are driven by the magnetic field of the rotor or by one or more sensors.

Such sensor means can be formed, for example, by means of magnetoresistive sensors. Since the sensor means are actuated by the magnetic field of the rotor the rotor itself need not be provided with any additional signal generation means.

A further advantageous embodiment of the invention is characterized in that the accuracy with which the angular position of the rotor is controlled varies non-uniformly over the actuation range of the control member.

As a result of this, the device can be adapted individually to the requirements imposed by the relevant applications. If the control member is, for example, a valve tappet in a liquid or a gas conduit, a highly accurate linear positioning of the tappet is desirable in the case of small displacements of the valve tappet, i.e. when the valve is slightly open, and a less accurate linear positioning of the valve tappet is allowed when the valve is wide open, i.e. in the case of large linear displacements. Consequently, the control accuracy of the angular position of the rotor in the initial portion of the angular range is greater than in the end portion of the angular position and, as a result, the positioning accuracy of the linear position of the control member for small displacements is greater than for large displacements.

Since the maximum angle of rotation of the rotor is smaller than 180° it seems that this device in accordance with the invention is not suitable for linear drives. However, when a coarse-pitch spindle is used a positioning range up to approximately 30 mm is attainable. The very high motor torque necessary to drive such a coarse-pitch spindle can be applied by means of the device in accordance with the invention. The use the coarse-pitch spindle reduces the return torque required to return the rotor into a preferred angular position when the stator excitation drops out. As a result, the return mechanism can be realized by an asymmetrical shape of the air gap and/or by means of the auxiliary magnet. The angular position of the rotor can be controlled continuously and positioning accuracies smaller than 0.1 angular degrees can be obtained. Thus, for linear movements smaller than 30 mm, the device in accordance with the invention has distinct advantages in comparison with the known devices with claw pole stepper motors.

By means of the device in accordance with the invention average speeds of movement of the control member from a starting position into an end position of more than 0.1 m/s can be reached. Such high average speeds of linear movement can be realized simply and at low cost by means of the device in accordance with the invention owing to the good dynamic characteristics of the device. Such high average speeds are hardly attainable by means of claw pole stepper motors.

By means of the device in accordance with the invention forces of more than 15 N can be applied. The device in accordance with the invention is particularly advantageous when such large maximum forces are required. When such a maximum force is required the device has distinct advantages as regards simplicity of construction and costs in comparison with systems comprising claw pole stepper motors. In order to achieve such maximum forces by means of claw pole stepper motors the dimensions should be significantly greater than those of the device in accordance with the invention.

Moreover, the device in accordance with the invention can be used advantageously in the case that the control member is exposed to ambient temperatures of at least 500° C. If the control member and, consequently, the threaded spindle are exposed to such temperatures, thermal expansion generally leads to an elongation of the threaded spindle. This causes the relationship between the angular position of the rotor and the linear position of the control member to change and this often requires a calibration of the relationship between the angular position of the rotor and the linear position of the control member in a reference position. If such a calibration is required, it is particularly advantageous to use the device in accordance with the invention. As compared with the use of a claw pole stepper motor this yields the additional advantage that as a result of the required calibration the maximum rotation of the rotor of the claw pole stepper motor is limited to 360°. Thus, the corresponding linear movement of the rotor of the claw pole stepper motor can be adjusted at the most with an accuracy slightly smaller than the number of steps per revolution. Thus, in the case of such an application the use of the device in accordance with the invention yields a distinctly higher accuracy in comparison with a claw pole stepper motor owing to the continuously variable angle of rotation of the rotor.

By means of a device in accordance with the invention linear it is possible to obtain positioning accuracies of the control member smaller than 10 μm.

Particularly in the case of such high positioning accuracies the device in accordance with the invention has distinct advantages as compared with a claw pole stepper motor. By means of the device in accordance with the invention such a positioning accuracy can be achieved simply and at low cost. In the case of a claw pole stepper motor such a high positioning accuracy would require a motor with a very large circumferential length, i.e. with a very large diameter. This would result in an overdimensioned motor, which in addition has a large inertia and, consequently, a poor dynamic performance. Besides, a solution using a claw pole stepper motor would require a spindle screwthread having a comparatively fine pitch. If an application then requires a return to a given preferred position when the stator current cuts out, very high return forces and thus very complex constructions in order to obtain these return forces will be required as a result of the fine-pitch screwthread of the spindle.

The device in accordance with the invention can be used advantageously for the actuation of an exhaust gas recirculation valve in an exhaust gas recirculation conduit of an internal combustion engine.

The linear movement of the control member for this application is usually limited to values smaller than 30 mm and the required average speed between the shut-off position of the valve and the open position of the valve should often be at least 0.1 m/s. The actuation of the exhaust gas recirculation valve often requires maximum forces of at least 15 N. In addition, the exhaust gas recirculation valve and thus the threaded spindle is exposed to a hot gas of approximately 600° C. to 800° C. in operation and often a high positioning accuracy is required.

The device in accordance with the invention can be used advantageously in an internal combustion engine, or in a motor vehicle with an internal combustion engine, particularly for the actuation of an exhaust gas recirculation valve.

BRIEF DESCRIPTION OF THE DRAWING

Some embodiments of the invention will be described in more detail, by way of example, with reference to FIGS. 1 to 4 of the drawings. In the drawings.

DESCRIPTION OF THE PREFERRED EMBODIMENTS

Figure 1:
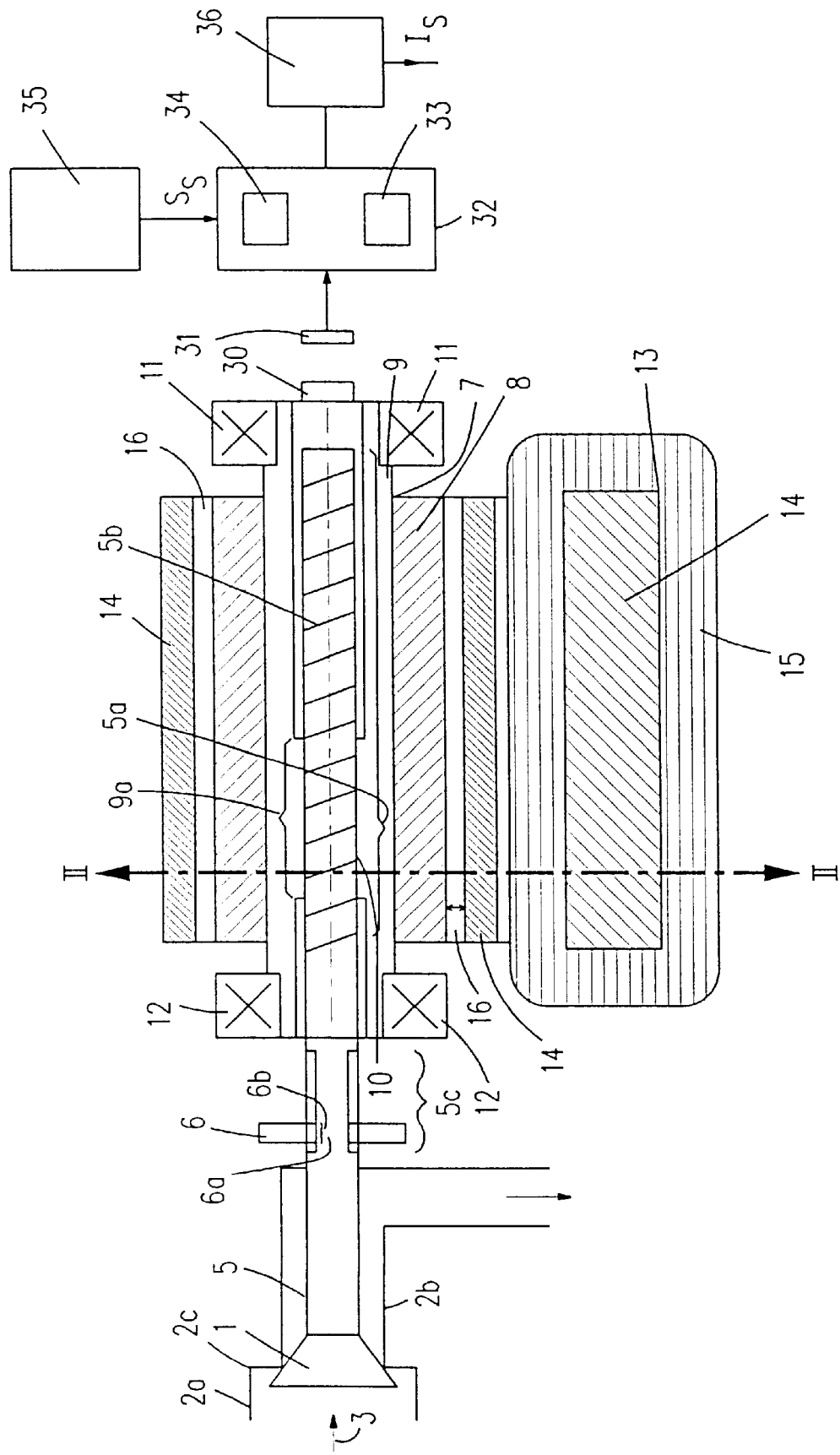
FIG. 1 is a sectional view showing a device for linearly moving a valve tappet in a gas or liquid conduit, comprising a rotor having internal screwthread, a single-strand stator, and a threaded spindle which engages with the internal screwthread of the rotor, the valve tappet being shown in a shut-off position.

FIG. 1 is a sectional view showing a device for linearly moving a valve tappet 1 arranged in a gas or liquid conduit 2, the sectional view applying both to a first embodiment and to a second embodiment. The gas or liquid conduit 2 comprises a first part 2a having a first diameter and a second part 2b having a second diameter, the first diameter being larger than the second diameter. The gas or liquid flows through the gas or liquid conduit 2 in a direction indicated by an arrow 3. The passage 2c between the first part 2a and the second part 2b of the gas or liquid conduit 2 can be closed and opened by a linear movement of the valve tappet 1 in a direction opposite to that indicated by the arrow 3 and in the direction indicated by the arrow 3, respectively. In the situation shown in FIG. 1 the valve tappet 1 is in the shut-off position.

The valve tappet 2 is secured to a threaded spindle 5 having a portion 5a with outer screwthread 5b. The threaded spindle 5 has a square locking portion 5c. A locking element 6 has a square opening 6a in which the square locking portion 5c of the threaded spindle 5 interlocks in an area 6b. In a manner, not shown, the locking element 6 is secured a housing, not shown, of the device. The threaded spindle 5 is locked against rotation by the cooperation between the locking portion 5c of the threaded spindle 5 and the locking element 6. Other shapes of the locking portion 5c are also conceivable. A rotor 7 constructed as a magnetized rotary body comprises an outer cylindrical permanent magnet 8 and an inner cylindrical plastic body 9. In a portion 9a the plastic body 9 has an inner screwthread 10. The outer screwthread 5b of the threaded spindle 5 engages with this inner screwthread 10. The rotor 7 is supported in the housing, not shown, of the device by means of a first bearing 11 and by means of a second bearing 12. A stator 13 has an iron member 14 in which a stator winding 15 is arranged. The iron member 14 can alternatively consist of other high-permeability materials, such as for example steel, sintered iron or laminated electric sheets. The iron member 14 and the cylindrical permanent magnet 8 are separated from one another by an air gap 16.

Figure 2:
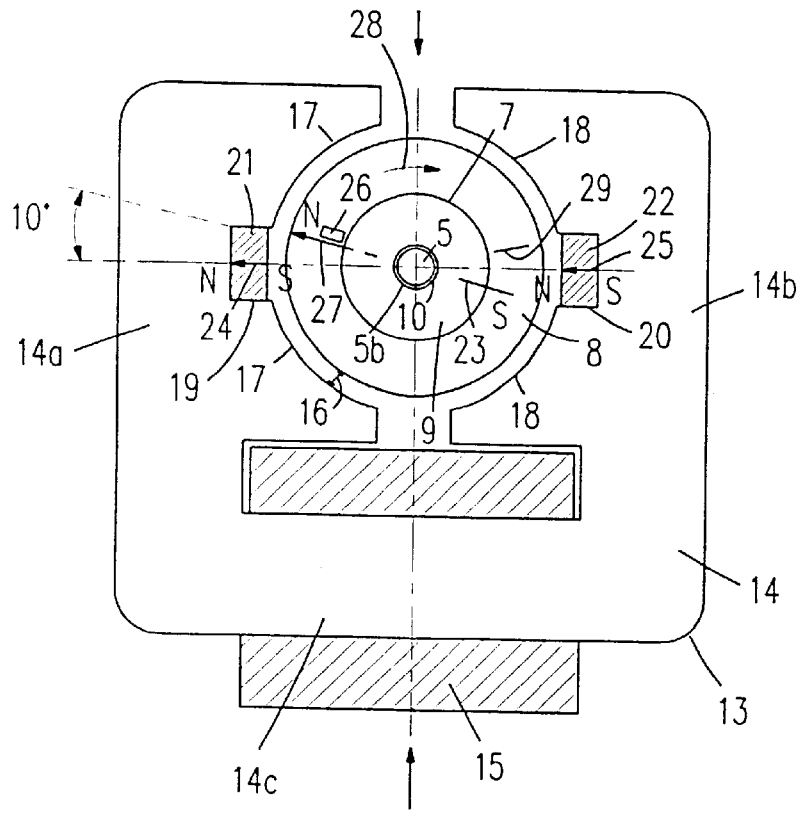
FIG. 2 shows a first embodiment of the device in a is a sectional view taken on the line II—II in FIG. 1, in which a return torque is generated by means of two auxiliary magnets.

The operation and the detailed construction of the stator 13 and the rotor 7 will be described hereinafter with reference to FIG. 2, which shows the first embodiment in a sectional view taken on the line II—II in FIG. 1. The iron member 14 is U-shaped and has a first limb 14a and a second limb 14b, which are connected to one another by means of a yoke 14c. The stator winding 15 is wound around the yoke 14c between the limbs 14a and 14b. The first limb 14a and the second limb 14b are constructed as pole shoes having pole arcs 17 and 18, respectively, which bound the air gap 16 at the outside. The pole arcs 17 and 18 are interrupted at their centers by a first slot 19 and a second slot 20. A first auxiliary magnet 21 is embedded in the first slot 19 and a second auxiliary magnet 22 is embedded in the second slot 20. The cylindrical permanent magnet 8 is magnetized so as to have two poles in the direction indicated by the arrow 23 and thus has a north pole N and a south pole S. The first auxiliary magnet 21 is magnetized so as to have two poles in a direction indicated by an arrow 24, and the second auxiliary magnet 22 is magnetized in a direction indicated by an arrow 25. The air gap 16 has a constant width at the location of the pole arcs 17 and 18.

The first auxiliary magnet 21 and the second auxiliary magnet 22 form a return mechanism for the cylindrical permanent magnet 8 and generate a magnetic flux of such a strength and direction that, when the stator winding 15 is not energized, the cylindrical permanent magnet 8 tends to orient itself in the direction of the magnetic flux of the first auxiliary magnet 21 and the second auxiliary magnet 22. However, the rotor 7 carries a stop pin 26 which, when the stator winding 15 is not energized, abuts against a stop edge 27 on the stator 13 owing to the return mechanism formed by the first and the second auxiliary magnet 21 and 22. This angular position of the rotor 7, which corresponds to the angular position of the rotor 7 shown in FIG. 2, is referred to as the angular shut-off position. The stop edge 27 extends at an angle of 10° with respect to the directions of magnetization of the first auxiliary magnet 21 and the second auxiliary magnet 22. If the stator winding 15 is now energized with a stator current, the rotor 7 is moved clockwise in an opening direction 28 opposed by the return forces exerted by the first auxiliary magnet 21 and the second auxiliary magnet 22. The return torque of the first auxiliary magnet 21 and the second auxiliary magnet 22 which opposes this movement in the opening direction 28 constantly tends to return the rotor 7 into the angular shut-off position. Without the use of a mechanical return spring it constitutes a mechanism which exerts a return action. As a result, the device is very simple both mechanically and electrically. However, it may also be envisaged to construct the return mechanism by means of mechanical springs. By a suitable adjustment of the stator current it can be achieved that, starting form the angular shut-off position shown in FIG. 2, the rotor is moved through approximately 160° in the opening direction 28. In the angular opening position the stop pin 26 of the rotor 7 abuts against a second stop edge 29, which is offset from the first stop edge 27 by 160° in the opening direction 28. In the absence of the first stop edge 27 the rotor 7 would move to an angular position of 0° when the energization of the stator 13 ceases, which angular position corresponds to the direction of magnetization of the first auxiliary magnet 21 and the second auxiliary magnet 22. The device generates a torque which varies sinusoidally between this angular position of 0° and an angular position of 180°, in which the rotor 7 has been rotated through 180° relative to the angular position of 0°. In the angular position of 0° and the angular position of 180° the torque would also be approximately zero while the stator winding 15 is energized and a reliable and faultless rotation of the rotor 7 could not be guaranteed. Therefore, the angular shut-off position of the rotor 7 is shifted through approximately 10° by means of the first stop edge 27 and the angular opening position is shifted through 170° relative to the 0° angular position by means of the second stop edge 29. It is also possible to arrange the first stop edge 27 and the second stop edge 29 asymmetrically relative to the angular positions of 0° and 180°. In the angular shut-off position a torque which differs distinctly from zero acts upon the rotor 7 when the stator winding 15 is energized, and the rotor 7 is moved in the opening direction 28 when the stator 13 is energized. By means of an appropriate adjustment of the current in the stator winding 15 the rotor 7 can be moved continuously from the angular shut-off position into the angular opening position. The first and the second stop edge 27 and 29 thus guarantee a faultless and reliable performance of the device.

The conversion of the rotary movement of the rotor 7 into the linear movement of the threaded spindle 5 will now be explained with reference to FIG. 1. The rotary movement of the rotor 7 in the opening direction 28 is converted into a linear movement in a direction opposite to that indicated by the arrow 3 by means of the outer screwthread 5b which engages with the inner screwthread 10 of the rotor 7. As a result of this, the valve tappet 1 is also moved in a direction opposite to that indicated by the arrow 3, and the passage 2c between the first conduit part 2a and the second conduit part 2b of the gas or liquid conduit 2 is opened. The linear movement of the valve tappet 1 now proceeds very accurately and continuously and not in separate discrete steps as in the case of, for example, a claw pole stepper motor. In order to increase the positioning accuracy for the linear position of the valve tappet 1 the rotor 7 carries an angular-position generator 30, which transfers the instantaneous angular position of the rotor 7 to an angular-position pickup 31. The angular-position generator 30 can be constructed, for example, as a permanent magnet and the angular-position pickup as a magneto-resistive sensor. However, it is also possible to dispense with the angular-position generator 30 and to drive the magneto-resistive sensor directly with the radial magnetic field of the permanent magnet 8. Furthermore, the angular-position pickup 31 can be formed by a potentiometer or a Hall sensor. The angular-position pickup 31 transfers the current angular position of the rotor 7, i.e. a signal characteristic of the current angular position of the rotor 7, to a microcontroller 32. This microcontroller 32 comprises control means 33 and calibration means 34. The microcontroller 32 is further coupled to a control unit 35 and a power supply circuit 36. The power supply circuit 36 supplies a stator current $I_S$ to the stator winding 15 of the stator 13. The control unit 35 supplies control information $S_S$ to the microcontroller 32, which information indicates the linear position to be assumed by the valve tappet 1. Depending on the control information $S_S$ a certain stator current $I_S$ is set by means of the microcontroller 32. As a result of this stator current $I_S$, the rotor 7 now assumes a certain angular position and, consequently, the valve tappet 1 assumes certain linear position. The current angular position of the rotor 7 is transmitted to the microcontroller by means of the angular-position generator 30 and the angular-position pickup 31 and, if necessary, the microcontroller corrects the stator current $I_S$ with the aid of the control means 33. Instead of the angular-position generator 30 and the angular-position pickup 31 it is also possible to use linear-position generators and the linear-position pickups, which detect the linear position of the threaded spindle (5). By means of this control method it is possible to achieve an accuracy of less than 0.1° for the angular position of the rotor 7.

The valve tappet 1 and a large part of the threaded spindle 5 are disposed inside the gas or liquid conduit 2. If a hot fluid passes through this gas or liquid conduit 2 the threaded spindle 5 will expand owing to thermal expansion. As a result of this, the relationship between the current angular position of the rotor 7 and the current linear position of the valve tappet 1 is changed. The calibration means 34 of the microcontroller 32 serve to correct this relationship in the case of expansion of the threaded spindle 5. When the valve tappet 1 is in the shut-off position shown in FIG. 1, the linear position of the valve tappet 1 is unambiguously defined. The microcontroller 32 then receives a calibration signal which indicates to the microcontroller 32 that the valve tappet 1 is in the shut-off position. The current relationship between the current angular position of the rotor 7 and the current linear position of the valve tappet 1 is then calibrated with the aid of the calibration means 34. As a result of this, the linear positioning accuracy of the valve tappet 1 in the case of an expanding threaded spindle is increased significantly.

Figure 3:
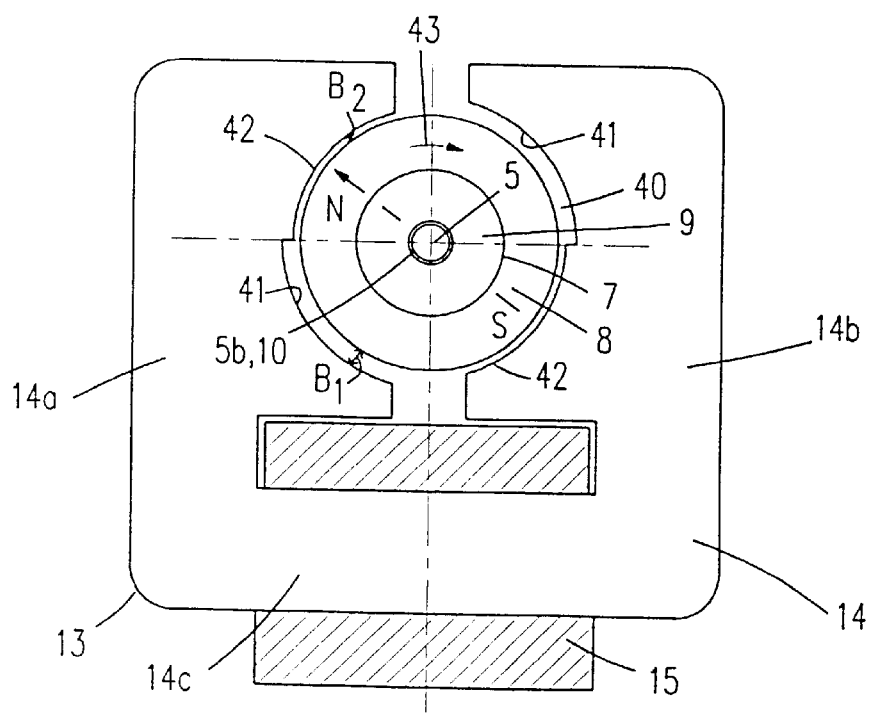
FIG. 3 shows a second embodiment of the device in a is a sectional view taken on the line II—II in FIG. 1, in which the return torque is obtained by giving the air gap a non-uniform shape.

FIG. 3 shows the second embodiment of the invention in a sectional view taken on the line II—II in FIG. 1. Similar reference symbols are used wherever the second embodiment corresponds to the first embodiment. A cylindrical rotor 7 comprises an outer cylindrical permanent magnet 8 and an inner cylindrical plastic body 9. The plastic body 9 has an inner screwthread 10, in which the outer screwthread 5b of a threaded spindle 5 engages. A stator 13 has an iron member 14 in which a stator winding 15 is arranged. The iron member 14 can alternatively consist of other high-permeability materials, such as for example steel, sintered iron or laminated electric sheets. The iron member 14 is U-shaped and has a first limb 14a and a second limb 14b, which are connected to one another by means of a yoke 14c. The stator winding 15 is wound around the yoke 14c between the limbs 14a and 14b. The iron member 14 and the cylindrical permanent magnet 8 are separated from one another by an air gap 40. The iron member 14 has two diametrally opposed pole arc portions 41 and two diametrally opposed pole arc portions 42. At the location of the pole arc portions 41 the air gap 40 has a first width $B_1$ and at the location of the pole arc portions 42 the air gap 40 has a second width $B_2$, the first width $B_1$ being larger than the second width $B_2$. The cylindrical permanent magnet 8 is magnetized so as to have two poles and thus has a north pole N and a south pole S. When the stator winding 15 is not energized the rotor 7 assumes a position in accordance with its magnetization, which position corresponds to the position of minimal magnetic resistance. This position is shown in FIG. 3. When the stator winding 15 is energized, the rotor 7 is moved in the opening direction 43 opposed by the magnetic return forces. The detent torque which opposes this movement in the opening direction 43 and which is caused by the non-uniform shape of the air gap 40 constantly tends to move the rotor 5 back in a direction opposite to the opening direction 43. Without the use of a mechanical return spring a mechanism is formed which exerts a return action in a mechanically and electrically simple manner. The reliability of the actuation by means of the rotor 7 can be increased, in the same way as in the first embodiment, by means of stop pins and stop edges, not shown, which limit the range of movement to 160°.

Figure 4:
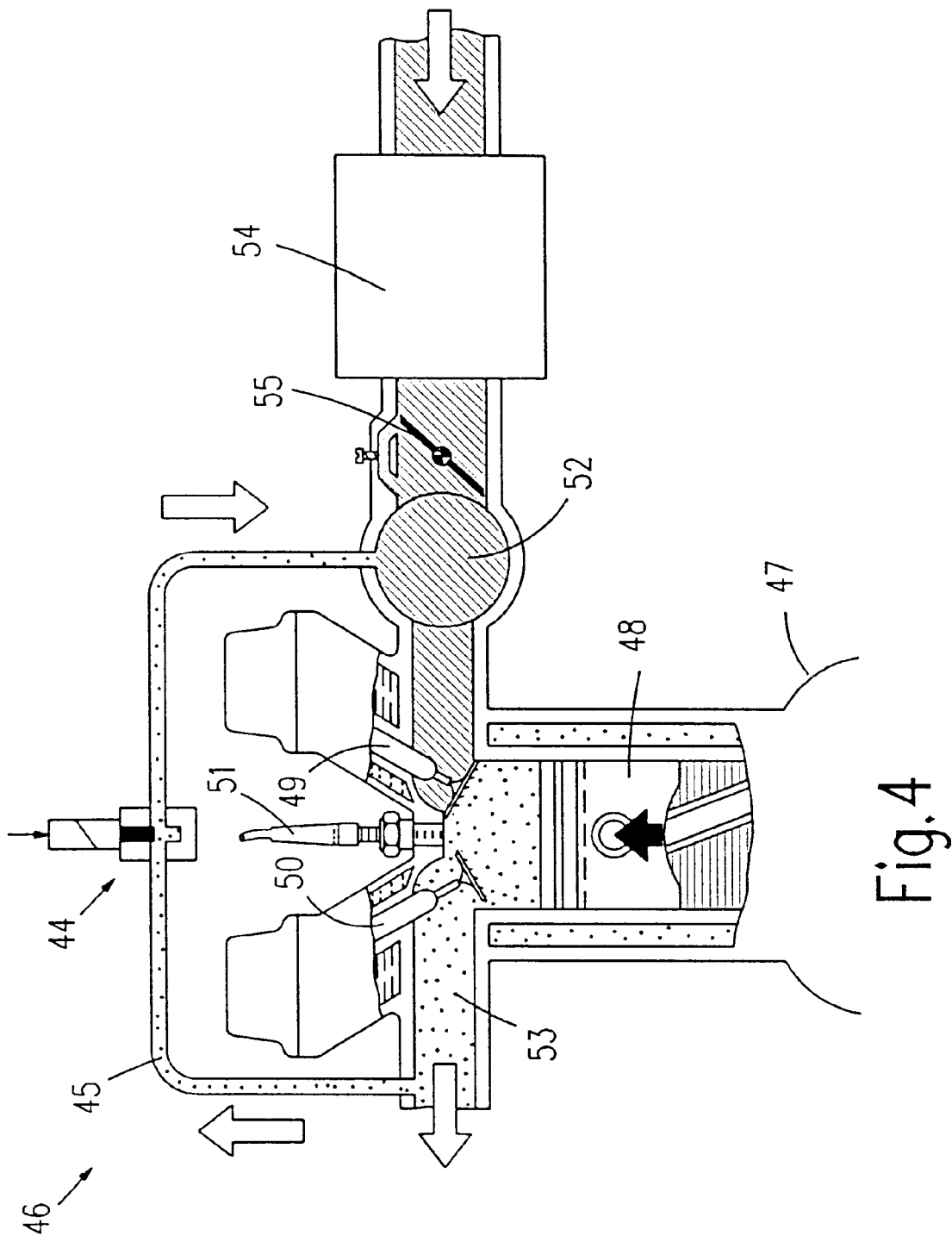
FIG. 4 is a basic diagram showing an advantageous use of the device in accordance with the invention for the actuation of an exhaust gas recirculation valve in an exhaust gas recirculation conduit of an internal combustion engine.

FIG. 4 is a basic diagram showing the use of the device in accordance with the invention for the actuation of an exhaust gas recirculation valve 44 in an exhaust gas recirculation conduit 45 of an internal combustion engine 46. A piston 48 is movable in a cylinder 47 of the internal combustion engine 46. The cylinder 47 has an intake valve 49, an exhaust valve 50 and an ignition device 51. There are an intake valve conduit 52 and an exhaust valve conduit 53. The intake valve conduit 52 and the exhaust valve conduit 53 are connected to one another by means of the exhaust gas recirculation conduit 45. The exhaust gas recirculation valve 44 is included in the exhaust gas recirculation conduit 45 to open or to shut off the exhaust gas recirculation conduit 45. A fuel-air mixture is supplied to the intake valve conduit 52 by means of a mixing unit 54 and a throttle valve 55. When the intake valve 49 is open the fuel-air mixture flows into the cylinder 47, is compressed by means of the piston 48, is ignited before the upper dead center of the piston stroke, and expands while delivering power. Subsequently, the fuel-air mixture is forced into the exhaust valve conduit by means of the plunger 48 via the open exhaust valve. A part of this exhaust gas in the exhaust valve conduit can be returned into he intake valve conduit 52 via the exhaust gas recirculation conduit 45 when the exhaust gas recirculation valve 44 is open, in order to be burnt again. The internal combustion engine 46 can also be a diesel engine. Such an exhaust gas recirculation reduces the pollutant emission of the internal combustion engine, it improves the efficiency and it reduces fuel consumption. The valve tappet, not shown, of the exhaust gas recirculation valve 44 is actuated by the device in accordance with the invention. In operation the hot gas in the exhaust gas recirculation conduit 45 has a temperature between 600° C. and 800° C. The actuation of the exhaust gas recirculation valve 44 often requires maximum forces of at least 15 N and closing times of less than 200 ms. The device in accordance with the invention meets these requirements.

I claim:

1. A device for the linear actuation of a control member, particularly a valve tappet in a gas or liquid conduit, the device comprising a rotor having an inner screwthread whose rotary movement is convertible into a linear movement of a threaded spindle which is locked against rotation and which is engageable with the inner screwthread, characterized in that the rotor comprises a magnetized rotary body which cooperates with a single-strand electrically energizable stator, the angular position of the rotor being adjustable by means of the stator current and the maximum angular rotation of the rotor being smaller than 180°.

2. A device as claimed in claim 1, characterized in that sensor means have been provided to generate sensor signals in dependence on the angular position of the rotor or the linear position of the threaded spindle, and control means have been provided to control the angular position of the rotor in dependence on the sensor signals.

3. A device as claimed in claim 1, characterized in that measurement means have been provided to measure the current and the voltage of the stator, the measurement means generate measurement signals in dependence on the angular position of the rotor, and control means have been provided to control the angular position of the rotor in dependence on the measurement signals.

4. A device as claimed in claim 1, characterized in that the inner screwthread of the rotor and the screwthread of the threaded spindle are coarse-pitch screwthreads having a pitch angle of at least 30°.

5. A device as claimed in claim 1, characterized in that calibration means have been provided to calibrate the relationship between the angular position of the rotor and the linear position of the control member in a reference position of the control member.

6. A device as claimed in claim 5, characterized in that the control member is a valve tappet of a valve and the reference position corresponds to the shut-off position of the valve.

7. A device as claimed in claim 1, characterized in that the gap between the stator and the rotor is given such a non-uniform shape that the rotor assumes a preferred angular position when the stator is not energized.

8. A device as claimed in claim 1, characterized in that there has been provided at least one auxiliary magnet which moves the rotor into the preferred angular position when the stator is not energized.

9. A device as claimed in claim 2, characterized in that the sensor means for controlling the angular position of the rotor are driven by the magnetic field of the rotor or by one or more sensors.

10. A device as claimed in claim 2, characterized in that the accuracy with which the angular position of the rotor is controlled varies non-uniformly over the actuation range of the control member.

11. A device for actuating a valve in a gas or liquid conduit of an internal combustion engine, the gas or the liquid having temperatures of more than 400° C. during operation, said device comprising a rotor having an inner screwthread whose rotary movement is convertible into a linear movement of a threaded spindle which is locked against rotation and which is engageable with the inner screwthread, characterized in that the rotor comprises a magnetized rotary body which cooperates with a single-strand electrically energizable stator, the angular position of the rotor being adjustable by means of the stator current and the maximum angular rotation of the rotor being smaller than 180°.

12. A device for actuating an exhaust gas recirculation valve in an exhaust gas recirculation conduit of an internal combustion engine said device comprising a rotor having an inner screwthread whose rotary movement is convertible into a linear movement of a threaded spindle which is locked against rotation and which is engageable with the inner screwthread, characterized in that the rotor comprises a magnetized rotary body which cooperates with a single-strand electrically energizable stator, the angular position of the rotor being adjustable by means of the stator current and the maximum angular rotation of the rotor being smaller than 180°.

13. An internal combustion engine having an exhaust gas recirculation conduit in which an exhaust gas recirculation valve is arranged and a device for actuating said valve, said device comprising a rotor having an inner screwthread whose rotary movement is convertible into a linear movement of a threaded spindle which is locked against rotation and which is engageable with the inner screwthread, characterized in that the rotor comprises a magnetized rotary body which cooperates with a single-strand electrically energizable stator, the angular position of the rotor being adjustable by means of the stator current and the maximum angular rotation of the rotor being smaller than 180°.

14. A motor vehicle having an internal combustion engine and having an exhaust gas recirculation conduit in which an exhaust gas recirculation valve is arranged and a device for actuating said valve, said device comprising a rotor having an inner screwthread whose rotary movement is convertible into a linear movement of a threaded spindle which is locked against rotation and which is engageable with the inner screwthread, characterized in that the rotor comprises a magnetized rotary body which cooperates with a single-strand electrically energizable stator, the angular position of the rotor being adjustable by means of the stator current and the maximum angular rotation of the rotor being smaller than 180°.

* * * * *